Patented May 10, 1949

2,469,725

UNITED STATES PATENT OFFICE 2,469,725

SYNTHETIC LUBRICATION OIL PRODUCTION

Raymond L. Heinrich, Baytown, Tex., assignor, by mesne assignments, to Standard Oil Development Company, Elizabeth, N. J., a corporation of Delaware No Drawing. Application March 7, 1947, Serial No. 733,182

3 Claims. (Cl. 260—683.15)

The present invention is directed to a method for polymerizing alpha olefins. More particularly, the invention is directed to a method for producing polymers having lubricating oil qualities.

It has been known to polymerize alpha olefins in the presence of Friedel-Crafts type catalyst to obtain polymers having lubricating oil characteristics. The production of lubricating oil polymers from alpha olefins has been attended by a number of disadvantages, among which were the small source of supply of the alpha olefins and the difficulty in separating the alpha olefins from mixtures with other olefinic hydrocarbons having the same number of carbon atoms. This problem has attracted a number of workers both in the United States and in foreign countries. Polymerization of olefins in the presence of a Friedel-Crafts type catalyst to form a polymer suitable for use as lubricants has resulted in a large volume of experimental work and the issuance of and build up of a voluminous literature. The process has even achieved commercial success in foreign countries and commercial quantities of lubricating oil have been produced by polymerization of these olefins. Even in the United States where natural lubricants have heretofore been plentiful, the olefins obtained by cracking wax have been polymerized for lubricating oil on a commercial scale employing a Friedel-Crafts type catalyst in the reaction. However, when efforts were made to adapt the process to the manufacture of lubricating oils from thermal and catalytic cracking products such as are conventional in the continental United States and elsewhere, little success was obtained. For example, the oils obtained by polymerizing the olefins obtained by thermal and catalytic cracking are usually of low viscosity index. The reason for the lack of success in polymerizing the mixed olefins from thermal and catalytic cracking operations in the United States have been found to be due to the presence of contaminating olefins of the beta olefin type. It has also been found, contrary to the prior art workers, that the tertiary olefin may be polymerized in admixture with the alpha mono-olefin to obtain valuable lubricating oil polymers.

It is, therefore, the main object of the present invention to provide a process for producing high molecular weight olefin polymers from mixtures of olefins having the same molecular weight.

Another object of the present invention is to provide a method for polymerizing a mixture of alpha mono-olefins and tertiary mono-olefins to form a valuable lubricating oil polymer.

The objects of the present invention may be achieved by polymerizing an alpha olefin in admixture with a tertiary olefin under suitable conditions of temperature and pressure and in the presence of a polymerization catalyst to form a polymer in the lubricating oil boiling range.

Briefly, the present invention may be described as embodying the steps of separating a mixture of alpha mono-olefins and tertiary mono-olefins from beta mono-olefins of the same molecular weight and then subjecting the mixture of alpha mono-olefins and tertiary mono-olefin to polymerization conditions in the presence of a suitable catalyst to obtain a polymer of high molecular weight and boiling in the lubricating oil boiling range.

It is fortunate that the two classes of olefins, the alpha and beta mono-olefins, possess different boiling points so that separation of the alpha olefins from the beta olefins may be effected. The separation, however, becomes more difficult as the number of carbon atoms in the olefin molecule increases.

In Table I, following, the boiling point of the more commonly occurring olefins having 4, 5 and 6 carbon atoms and obtained by thermal or catalytic cracking operations are presented:

Table I

| $C_4$ Fraction | | $C_5$ Fraction | | $C_6$ Fraction | |
|---|---|---|---|---|---|
| Structure | B. P., °F. | Structure | B. P., °F. | Structure | B. P., °F. |
| *Alpha Olefins* | | *Alpha Olefins* | | *Alpha Olefins* | |
| C=C—C—C | 21 | C=C—C—C—C | 86 | C=C—C—C—C—C | 147' |
| C=C—C<br>    |<br>    C | 20 | C=C—C—C<br>      |<br>      C | 88 | C=C—C—C—C<br>        |<br>        C | 144' |
| *Beta Olefins* | | *Beta Olefins* | | *Beta Olefins* | |
| C—C=C—C | 34-39 | C—C=C—C—C | 97-99 | C—C=C—C—C—C | 154-155 |
| | | C—C=C—C<br>    |<br>    C | 101' | C—C=C—C—C<br>      |<br>      C | |

It will be apparent from the foregoing data that the alpha mono-olefins and the tertiary mono-olefins have boiling points nearly identical while the beta mono-olefins have considerably different boiling points. It is, therefore, possible in accordance with the present invention to separate a mixture of the alpha and tertiary mono-olefins from the beta mono-olefins and provide a suitable feed for the polymerization reaction.

It has been found that the straight chain alpha olefins or the alpha olefins containing only a single methyl group as a side chain may be polymerized to obtain a high viscosity polymer in almost quantitative yields whereas beta olefins on polymerization, as shown by the data in the following Table II, form a comparatively low viscosity index polymer and the yield of oily material is also low. Further, it has been found that the polymerization of a mixture of a straight chain alpha olefin and an alpha tertiary olefin, such as could be separated from other olefins of the same molecular weight by distillation, produces a polymer of higher viscosity index than that possessed by the polymer of either the straight chain alpha olefin or the alpha tertiary olefin alone.

In the following Table II, results are presented showing comparisons of polymerization of beta olefins, polymerization of tertiary alpha olefin, and polymerization of alpha mono-olefins. These runs were conducted while employing aluminum chloride as the catalyst in an amount between 2 and 20 weight per cent at a temperature ranging from 50° to 100° F. with the reaction being carried out in a hydrocarbon diluent boiling at the reaction temperature and, therefore, allowing the heat of reaction to be removed by vaporization of the diluent:

*Table II*

| Olefin Polymerized | Yield of Oily Polymer Weight Per Cent of Olefin Charge | Vis. At 210° F. of Polymer | Viscosity Index of Polymer | Structure of Olefin |
|---|---|---|---|---|
| Butylene-1 | 91-93 | 237-313 | 81-85 | C=C—C—C |
| Isobutylene | 85 | 1,175 | 91 | C=C—C / C |
| Butene-2 | 25 | 53 | -18 | C—C=C—C |
| Pentene-1 | 94-98 | 126-245 | 94-98 | C=C—C—C—C |
| Pentene-2 | 26 | 55 | 67 | C—C=C—C—C |

It will be apparent from the data in the foregoing table that products of high viscosity index are produced by polymerizing both the alpha mono-olefins and the alpha tertiary olefins, but that products of reduced viscosity index are produced when the beta olefins are the feed stock.

Subsequent runs were then made polymerizing in one case butylene-1, in another case isobutylene, and still another case, an equal weight mixture of butylene-1 and isobutylene. These polymerizations were carried out under conditions similar to those reported for the runs illustrated in Table II. The results of and the conditions obtaining during these runs are given in the following Table III:

*Table III*

| Olefin Feed Stock Composition, Wt. Percent: | | | |
|---|---|---|---|
| Butylene-1 | 100 | 0 | 50 |
| Isobutylene | 0 | 100 | 50 |
| Tests on Polymer: | | | |
| Viscosity 210° F | 237 | 1,175 | 190 |
| Viscosity Index | 81 | 91 | 93 |
| Reactions Conditions: | | | |
| Charge, Wt. Percent— | | | |
| Butylene-1 | 25 | 0 | 16 |
| Isobutylene | 0 | 49 | 16 |
| Isopentane | 75 | 51 | 68 |
| AlCl₃ Catalyst, Wt. Percent of Olefins | 6 | 4 | 3 |
| Temperature, °F | 70 | 45 | 75 |
| Reaction time, hours | 1 | 2 | 3 |
| Lube Yield, Wt. Percent of Olefins | 93 | 85 | 92 |

It will be apparent from the foregoing data that the product produced by polymerizing a mixture of butylene-1 and isobutylene has a higher viscosity index than either the butylene-1 and isobutylene polymerized separately.

It will be noted that the yields of lubricating oil in the practice of the present invention were substantially the same as that obtained when polymerizing the butylene-1 alone; thus, in fact the amount of lubricating oil produced in accordance with the present invention may be approximately doubled over that produced from alpha olefins alone since substantially the same yield is obtained from an equal weight mixture of the alpha mono-olefin and the alpha tertiary olefin than from the alpha olefin alone.

The alpha olefins employed in the practice of the present invention may be those alpha olefins illustrated by butylene-1, pentylene-1 heptylene-1, and other alpha olefins of the same homologous series. The alpha tertiary olefins which form the other component of the feed stock of the present invention should be alpha tertiary olefins having the same number of carbon atoms as the alpha mono-olefins. As exemplary of the alpha tertiary olefins may be mentioned isobutylene, 2-methyl-butylene-1, and the like. Care should be taken to exclude the olefins having straight chains and side chains with the double bond in the two position since polymerization of these compounds results in inferior products.

The temperatures at which the polymerization may be conducted will range from about 40° F. up to about 180° F. with best results obtained in the range from about 70° to about 110° F. Actually, the polymerization operation may be carried out at substantially atmospheric temperature of approximately 85° F.

The reaction may be conducted in the presence of a diluent for the reaction such as a normal paraffin hydrocarbon as illustrated by normal pentane; however, in some instances it may be preferred to carry out the reaction in a diluent in the presence of an isoparaffin such as isobutane or isopentane and then subsequently saturating the polymers by allowing the isopentane to alkylate the residual unsaturation of the lubricating oil polymer.

The type of catalyst found most suitable in the practice of the present invention will be those Friedel-Crafts type catalysts as exemplified by aluminum chloride, ferric chloride, boron halides, and the other well known Friedel-Crafts type catalysts. However, the halides of aluminum and particularly aluminum chloride, in view of its commercial availability, will be preferred. The amount of catalyst to be employed in the practice of the present invention will ordinarily be very small and may range from about 2 to 20% by weight of the reactants. An amount of catalyst in the range of about 2 to 8% by weight of the olefins gives very good results.

The reaction time over which the polymerization of the alpha mono-olefins and the tertiary mono-olefins occurs will vary, depending on the type of reaction employed. For batch operation, as much as three hours may be necessary to allow the reaction to proceed to completion whereby a lubricating oil polymer is produced. Under continuous operation, however, the reaction time may be as little as twenty minutes or less.

When a mixture of alpha mono-olefins, alpha tertiary mono-olefins, and beta mono-olefins are distilled to recover a mixture of alpha mono-olefins and alpha tertiary mono-olefins under some conditions the ratio of alpha mono-olefins to tertiary mono-olefins may be lower or greater than the ratios found most suitable for the practice of the present invention. It is, therefore, contemplated that the ratio of alpha mono-olefins to alpha tertiary olefins in a feed mixture may be adjusted by adding amounts of either alpha mono-olefins or alpha tertiary mono-olefins to the mixture to form a mixture having the alpha mono-olefins and alpha tertiary olefins in substantially equal quantities. The alpha mono-olefins and the alpha tertiary olefins added to the mixture to adjust the ratios may be obtained from any source or may be obtained from the same source of the feed mixture subjected to fractional distillation. In other words, an amount of the feed mixture may be distilled to accumulate a quantity of either the alpha mono-olefins or alpha tertiary olefins for adjustment of the feed mixture undergoing polymerization.

Under some conditions, it may be desirable to polymerize a mixture of alpha mono-olefins and alpha tertiary olefins in which the amount of the mono-olefin or tertiary olefin is either greater or less than 1:1. It is within the scope of the invention to adjust the relative amounts of the components of the feed mixture.

Mention has been made of allowing the polymerization reaction to go to completion. It will be apparent that the reaction may be terminated at any point to allow the formation of lubricating oil polymers having widely varying viscosities. When the reaction is terminated, this may be conveniently accomplished by quenching the activity of the catalyst by adding water, alcohol, or other media having the ability to react with the catalyst. The polymerization may also be terminated by lowering the temperature or by removing the catalyst from the reactants. After the reaction has been terminated, the catalyst is separated from the product and the product treated to recover the valuable lubricating oil polymers.

The nature and objects of the present invention having been fully described and illustrated, what I wish to claim as new and useful and to secure by Letters Patent is:

1. A method for producing an improved lubricating oil which includes the steps of subjecting a first mixture including alpha and beta olefins and alpha tertiary olefins to a separation treatment to obtain a second mixture of alpha mono-olefins and alpha tertiary olefins, subjecting the second mixture of alpha mono-olefins and alpha tertiary olefins to polymerization conditions in the presence of a polymerization catalyst to form a polymer in the lubricating oil boiling range, separating the polymer from the catalyst and recovering a product suitable for use as a lubricating oil.

2. A method for producing an improved lubricating oil which includes the steps of distilling a mixture including alpha and beta mono-olefins and alpha tertiary olefins, recovering by distillation of said mixture a mixture of alpha mono-olefins and alpha tertiary olefins, subjecting said mixture to conditions of polymerization in the presence of a polymerization catalyst to form a polymer in the lubricating oil boiling range, separating polymer from the catalyst, and recovering from the polymer a product suitable for use as a lubricating oil.

3. A method for producing an improved lubricating oil which includes the steps of distilling a mixture including alpha and beta mono-olefins and alpha tertiary olefins, recovering by distillation a second mixture including alpha mono-olefins and alpha tertiary olefins, adjusting the proportions of alpha mono-olefins and alpha tertiary olefins in said second mixture, if necessary, so that substantially equal amounts thereof are in the adjusted second mixture, subjecting said adjusted second mixture to polymerization in the presence of a polymerization catalyst and a diluent for the reaction to form a polymer in the lubricating oil boiling range, terminating the polymerization reaction, separating the polymer from the catalyst, and recovering from the polymer a product suitable for use as a lubricating oil.

RAYMOND L. HEINRICH.

REFERENCES CITED

The following references are of record in the file of this patent:

UNITED STATES PATENTS

| Number | Name | Date |
| --- | --- | --- |
| 2,181,646 | Deanesly et al. | Nov. 28, 1940 |
| 2,401,933 | Hersberger | June 11, 1946 |
| 2,407,873 | Evering et al. | Sept. 17, 1946 |